United States Patent
Kogan

(10) Patent No.: US 8,762,356 B1
(45) Date of Patent: Jun. 24, 2014

(54) DETECTING CHANGE IN RATE OF INPUT RECEPTION

(75) Inventor: David Kogan, Natick, MA (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 13/184,267

(22) Filed: Jul. 15, 2011

(51) Int. Cl.
*G06F 7/00* (2006.01)

(52) U.S. Cl.
USPC ............ 707/705; 707/706; 715/802; 715/816

(58) Field of Classification Search
None
See application file for complete search history.

(56) References Cited

U.S. PATENT DOCUMENTS

| | | | |
|---|---|---|---|
| 6,307,548 B1 * | 10/2001 | Flinchem et al. ............. | 715/811 |
| 6,370,518 B1 * | 4/2002 | Payne et al. ............ | 1/1 |
| 6,377,965 B1 | 4/2002 | Hachamovitch et al. | |
| 6,411,950 B1 | 6/2002 | Moricz et al. | |
| 7,103,470 B2 | 9/2006 | Mintz | |
| 7,483,880 B2 | 1/2009 | Rossi et al. | |
| 7,672,932 B2 | 3/2010 | Hood et al. | |
| 7,836,044 B2 | 11/2010 | Kamvar et al. | |
| 8,645,825 B1 * | 2/2014 | Cornea et al. ................ | 715/257 |
| 2004/0186827 A1 | 9/2004 | Anick et al. | |
| 2004/0199498 A1 | 10/2004 | Kapur et al. | |
| 2006/0167995 A1 * | 7/2006 | Rui .............................. | 709/204 |
| 2006/0190436 A1 | 8/2006 | Richardson et al. | |
| 2006/0206454 A1 * | 9/2006 | Forstall et al. .................... | 707/3 |
| 2006/0271429 A1 * | 11/2006 | Borgs et al. ..................... | 705/14 |
| 2007/0050339 A1 | 3/2007 | Kasperski et al. | |
| 2007/0078828 A1 | 4/2007 | Parikh et al. | |
| 2007/0143262 A1 | 6/2007 | Kasperski | |
| 2008/0109401 A1 | 5/2008 | Sareen et al. | |
| 2008/0195577 A1 | 8/2008 | Fan et al. | |
| 2008/0208825 A1 | 8/2008 | Curtis et al. | |
| 2008/0256061 A1 | 10/2008 | Chang et al. | |
| 2008/0313359 A1 * | 12/2008 | Chi et al. ........................ | 710/18 |
| 2008/0319952 A1 * | 12/2008 | Carpenter et al. ................ | 707/3 |
| 2009/0043741 A1 | 2/2009 | Kim | |
| 2009/0083232 A1 | 3/2009 | Ives et al. | |
| 2009/0094211 A1 | 4/2009 | Marvit et al. | |
| 2009/0094551 A1 | 4/2009 | Alkov et al. | |
| 2009/0106224 A1 | 4/2009 | Roulland et al. | |
| 2009/0119289 A1 | 5/2009 | Gibbs et al. | |
| 2009/0179778 A1 * | 7/2009 | Molla ............................ | 341/22 |
| 2009/0187515 A1 | 7/2009 | Andrew et al. | |
| 2010/0138402 A1 * | 6/2010 | Burroughs et al. ........... | 707/706 |
| 2010/0306228 A1 | 12/2010 | Carpenter et al. | |
| 2011/0201387 A1 * | 8/2011 | Paek et al. ...................... | 455/566 |
| 2012/0047135 A1 | 2/2012 | Hansson et al. | |
| 2012/0167009 A1 * | 6/2012 | Davidson et al. ............. | 715/816 |

OTHER PUBLICATIONS

Chennavasin, Don "A look inside the world of search from the people of Yahoo!" http://www.ysearchblog.com/archives/000301.html. Yahoo! Search blog: Livesearch on AlltheWeb. May 9, 2006. 5 pages.

(Continued)

*Primary Examiner* — Fred I Ehichioya
*Assistant Examiner* — Hasanul Mobin
(74) *Attorney, Agent, or Firm* — Fish & Richardson P.C.

(57) ABSTRACT

Methods, systems, and apparatus including computer programs encoded on a computer storage medium for detecting change in rate of input reception. In one aspect, a series of keystrokes input by a user is received. A baseline time interval is determined for the user. A time interval between receiving a particular keystroke and receiving a preceding keystroke is determined. It is determined that the time interval exceeds the baseline time interval by a predetermined amount. Then, characters that correspond to one or more of the keystrokes, are transmitted to a search engine.

19 Claims, 5 Drawing Sheets

(56) References Cited

OTHER PUBLICATIONS

YouTube.com "Livesearch: Predictive Search Engine from Yahoo (2006)" http://www.youtube.com/watch?v=_EaSocSYSB8. [online] [retrieved Aug. 19, 2011].

McGee, Matt "Yahoo Had Instant Search in 2005 & Dropped It; Bing Kind of Has It Now," http://www.searchengineland.com. Sep. 9, 2010. 12 pages.

"The Real Live Search" http://www.istartedsomething.com/livesearch. [online] [retrieved on Aug. 5, 2011] 1 page.

Notification of Transmittal of the International Search Report and the Written Opinion of the International Searching Authority, or the Declaration for PCT/US2011/048419 dated Dec. 8, 2011, 18 pages.

Notification of Transmittal of the International Search Report and the Written Opinion of the International Searching Authority, or the Declaration for PCT/US2011/048407 dated Dec. 8, 2011, 13 pages.

Office Action issued in U.S. Appl. No. 13/213,904 on Sep. 13, 2012, 26 pages.

\* cited by examiner

DETECTING CHANGE IN RATE OF INPUT RECEPTION

BACKGROUND

This specification relates to user input.

A computer system can receive input from an input device, for example, a keyboard, a mouse, or a touch-screen display. The computer system processes the input in response to receiving an indication to do so. For example, the user can select an "Enter" key on a keyboard or an "OK" icon displayed in a user interface to indicate that the computer system can process the input that the user has provided. The computer system processes the received input upon receiving the indication.

In situations in which the user operates a client device that is connected to a server over a network, the client device can receive an indication from the user to transmit the input to the server over the network. In response, the client device can transmit the input to the computer system for processing. The server can receive and process the input, and can transmit the output of the processing to the client device over the network.

SUMMARY

A user operating a client device provides input to the client device using an input device, for example, a keyboard. In particular, using the keyboard, the user enters a series of keystrokes that may correspond to a string of characters. The client device determines a speed at which the user enters the keystrokes. When the client device determines that the speed has decreased below a baseline speed that the client device has determined for the user, then the client device determines a logical break in the user's input. For example, the user's input speed may have decreased because of an interruption in the user's thought process or because the user is unsure of what to type. Upon determining the logical break, the client device transmits the characters that correspond to the keystrokes received up through the determination of the logical break to one or more devices external to the client device, for example, a server system for a search engine.

The server system treats the received characters as a query term, identifies resources that satisfy the query term, and provides a search engine results page that references the identified resources to the client device. The client device renders the search engine results page in the display device. In this manner, the client device provides the user with a response to a partial user input upon determining a logical break in the input.

In general, one innovative aspect of the subject matter described in this specification can be embodied in methods that include the actions of receiving a series of keystrokes from a user, determining a baseline time interval for the user, determining a time interval between receiving a particular keystroke and receiving a preceding keystroke, and determining that the time interval exceeds the baseline time interval by a predetermined amount, then transmitting, to a search engine, characters that correspond to one or more of the keystrokes.

Other embodiments of these aspects include corresponding systems, apparatus, and computer programs configured to perform the actions of the methods, encoded on computer storage devices.

These and other embodiments can each optionally include one or more of the following features. In various examples, the particular keystroke is a last keystroke in the series, and the preceding keystroke is a next-to-last in the series. The particular keystroke is not the last keystroke in the series. The preceding keystroke is not the next-to-last keystroke in the series. The preceding keystroke is a keystroke that immediately precedes the particular keystroke. Determining the baseline time interval for the user further comprises determining the baseline time interval using three or more keystrokes of the series that precede the particular keystroke. Determining the baseline time interval for the user further comprises determining the baseline time interval from user profile information associated with the user. The characters are transmitted to the search engine in a request for search results. The characters are transmitted to the search engine in a request for search query auto-completions.

Particular implementations of the subject matter described in this specification can be implemented so as to realize one or more of the following potential advantages. The techniques can be implemented in situations in which a user expects a response to at least a portion of an input, particularly, prior to providing the entire input. In such situations, responses can be provided upon detecting that a rate at which the user is providing the input has decreased. For example, by implementing these techniques, search results or query term auto-completions or both can be provided in response to detecting logical breaks in the user's input, that are determined, for example, when a speed at which the user enters the query term decreases below a baseline speed determined for the user.

By providing output in response to detecting logical breaks, the user may not be distracted with search results or query auto-completions provided every time the user adds a character to the query term. Rather, a decrease in a rate at which the user enters the query term can be considered as an indication that the user is expecting a response. Upon receiving the indication, search results or query auto-completions, based on at least a portion of the query term that the user has entered, can be provided to the user. In this manner, a user-experience can be enhanced.

In addition, implementing the techniques can decrease constraints on a computer system that performs operations in response to receiving a user's input. For example, if several portions of a query term were transmitted to a search engine every time that a user added a character, then the load on the search engine can increase as a search will need to be performed for each incremental portion of the query term. By implementing the techniques described here, the load can be decreased by transmitting a portion of a query term based on detecting a change in the speed of user input.

In addition, a responsiveness of the search engine can be increased. Further, because a portion of the query term is transmitted to the search engine when the user is expecting a response, it is more likely that the transmitted portion matches the user's intended query term. Consequently, search results obtained based on the received portion are also likely to be more relevant to the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
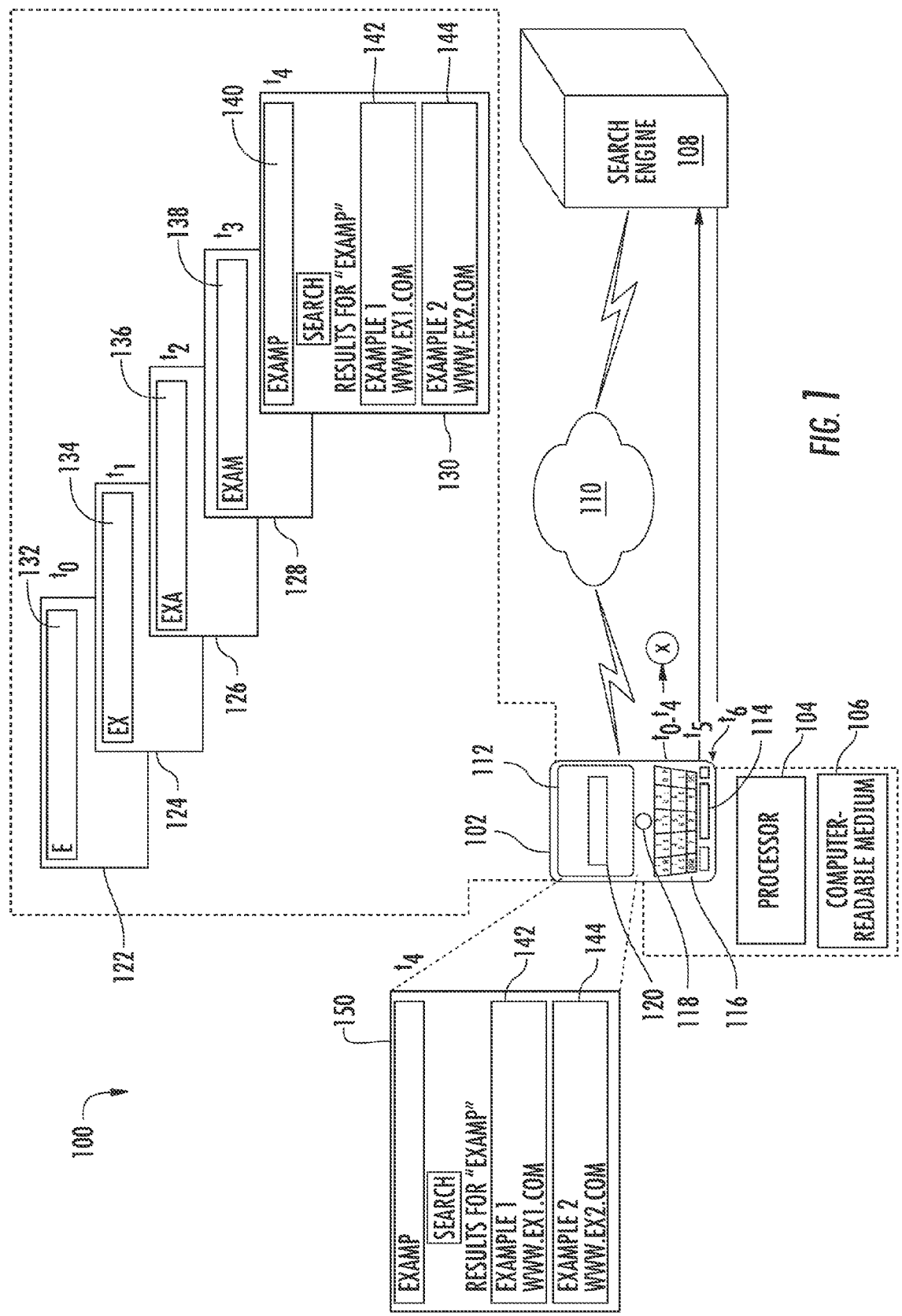
FIG. 1 illustrates an example of a client device and a computer system.

FIG. 1 illustrates an example of a client device 102 and a server system 108. The example client device 102 described with reference to FIG. 1 is a mobile device (for example, a mobile phone such as a smart phone, a personal digital assistant (PDA)). However, the client device 102 can be any computer, for example, a desktop computer, a tablet computer, or a laptop computer.

Among other components, the client device 102 includes data processing apparatus 104 and a computer-readable storage medium 106 storing computer software instructions executable by the data processing apparatus 104 to perform operations including those described below. The client device 102 includes input devices 114 (for example, a keyboard 116, a trackball 118) through which the client device 102 receives user input, and a display device 112 (for example, a touch screen) in which the client device 102 displays output. In particular, the client device 102 displays a user interface 120 within the display device 112 and displays the output within the user interface 120.

The client device 102 and the server system 108, which includes one or more computers, can be connected over one or more networks 110 (for example, the Internet, a 3G, 4G, 4G LTE, or any data network) such that the client device 102 transmits user input received through the input devices 114 to the server system 108 over the network 110. As input, the client device 102 receives a series of keystrokes corresponding to a series of characters entered by the user of the client device 102 through the keyboard 116. The client device 102 is configured to periodically transmit portions of the received keystrokes, one portion at a time, to the server system 108. In other words, the client device 102 can transmit characters that correspond to received keystrokes to the server system 108 without receiving an indication to do so, for example, by implementing asynchronous JavaScript and XML (AJAX).

Each portion that the client device 102 transmits includes characters that the client device 102 has received up through the time that the client device 102 transmits the portion. For example, if the client device 102 receives five characters in a series of five keystrokes, and determines to transmit input to the server system 108 at the time that the client device 102 receives the fifth character, the client device 102 transmits all five received characters. A number of characters that the client device 102 transmits to the server system 108 at a present time can be different from (for example, less than or more than) a number of characters that the client device 102 transmitted at a preceding time.

In some implementations, as described below, the client device 102 transmits characters that correspond to a series of keystrokes based on a change in a speed at which the keystrokes are received. For example, when the user initially provides a few keystrokes, the client device 102 can determine the user's typing speed. As the user continues to provide the keystrokes, the user may pause, for example, because the user is unsure of the spelling of a word that the user intends to type. The pause can result in a decrease in a speed at which the user types. The client device 102 can detect the decrease in speed, determine that the decrease satisfies certain conditions, and transmit characters that the user has provided until then to the server system 108 as an input. The server system 108 can receive and process the input, and transmit an output to the client device 102.

In this manner, the client device 102 receives a series of keystrokes that correspond to a series of characters. The client device 102 determines a time interval between receiving a particular keystroke and receiving a preceding keystroke. When the client device 102 determines that the time interval exceeds a baseline time interval that the client device 102 has determined for the user, the client device 102 determines that the user's typing speed has slowed. The client device 102 treats this decrease in typing speed as a logical break in the user input, and transmits what has been received until then to the server system 108 as a user input.

An example of keystrokes that the client device 102 receives and characters that the client device 102 transmits to the server system 108 is described below with reference to user interfaces 122-130 illustrated in FIG. 1. The example user interfaces describe a situation in which a user of the client device 102 is entering the word "example" using the keyboard 116. The client device 102 first receives a keystroke that corresponds to the letter "e." In response, the client device 102 displays the letter "e" in a text box 132 within the user interface 122 and notes a time, for example, $t_0$, at which the client device 102 received the keystroke. In response to receiving subsequent keystrokes, the client device 102 displays the letters "ex," "exa," "exam," and "examp" in text boxes 134, 136, 138, and 140, respectively, within user interfaces 124, 126, 128, and 130, respectively, and notes corresponding times, for example, $t_1$, $t_2$, $t_3$, and $t_4$, at which the keystrokes were received. In some implementations, the client device 102 can display a single user interface including a textbox, and display the characters in the textbox as the characters are received through the keystrokes.

For each received keystroke, except the first, the client device 102 determines a time interval between the particular keystroke and the preceding keystroke. Thus, in the example described above, the client device 102 can determine four time intervals, for example, $\Delta t_0 = t_1 - t_0$, $\Delta t_1 = t_2 - t_1$, $\Delta t_2 = t_3 - t_2$, $\Delta t_3 = t_4 - t_3$, after receiving five characters. In some implementations, after receiving a particular keystroke, for example, "p" in "examp," and determining the time interval between the particular keystroke (i.e., "p" in "examp") and a preceding keystroke (i.e., "m" in "exam"), the client device 102 compares the time interval with a baseline time interval tailored to the user and stored, for example, in the computer-readable storage medium 106. If the client device 102 determines that the determined time interval exceeds the stored baseline time interval, then the client device 102 transmits the characters that correspond to the keystrokes received until that time (i.e., "examp"), to the server system 108.

As described with reference to the example above, the particular keystroke can be the last received keystroke in the series of received keystrokes, and the preceding keystroke can be a next-to-last. Alternatively, the particular keystroke may not be the last keystroke in the series and the preceding keystroke may not be the next-to-last. The preceding keystroke can be a keystroke that immediately precedes the particular keystroke. For example, if the client device 102 determines that the determined time interval exceeds the stored baseline time interval after the client device 102 has received the keystroke corresponding to the letter "p", then the client device 102 can transmit the characters "exam" to the server system 108.

In some implementations, the client device 102 determines the baseline time interval using three or more keystrokes of the series that precede the particular keystroke. For example, the client device 102 can determine the baseline time interval from $\Delta t_1$, $\Delta t_2$, and $\Delta t_3$, and, more particularly, by determining an average of the three time intervals. In another example, if twenty characters were received through twenty respective keystrokes, then upon receiving the twentieth keystroke, the client device 102 can determine the baseline time interval from the time intervals between the seventeenth and eighteenth keystrokes, eighteenth and nineteenth keystrokes, and nineteenth and twentieth keystrokes. In some implementations, the client device 102 can determine the baseline time interval from more than three keystrokes that precede the particular keystroke. In this manner, the client device 102 can determine a baseline time interval personalized for the user based on the series of keystrokes that the client device 102 has received from the user immediately before determining the baseline time interval.

In some implementations, in addition to determining the baseline time as an average of multiple time intervals, the client device 102 can additionally determine a standard deviation from the average. The client device 102 can transmit the characters to the server system 108, when the client device 102 determines that the time interval between a particular keystroke and a preceding keystroke is greater than the baseline time by, for example, between 1.5 and 3.0 times the standard deviation.

In some implementations, the client device 102 determines the baseline time from user profile information associated with the user. For example, if a single user uses the client device 102, then, over time, the client device 102 can develop a user profile that includes information about the user's typing speed. To do so, every time that the client device 102 receives multiple keystrokes through the keyboard 116, particularly in the user interface 120, the client device 102 can determine a time interval between the particular keystroke and a preceding keystroke, and store the time intervals on the computer-readable storage medium 106. From the stored information, the client device 102 can determine a time interval between keystrokes and also determine a baseline time interval, for example, as an average of multiple time intervals. In this manner, the client device 102 determines a personalized baseline time interval for the user based on keystrokes that the client device 102 has received from the user over time.

In some situations, the client device 102 can determine the personalized baseline time interval as a combination of a baseline time interval determined from the user's profile information and a baseline time interval determined based on keystrokes received immediately before determining the baseline time interval. For example, the client device 102 can determine a baseline time interval for each of multiple search sessions in which the client device 102 receives keystrokes from the user, and determine an average time interval for the multiple search sessions. Then, the client device 102 can determine a new baseline time interval from keystrokes received in a new search session, and determine a combined baseline time interval as an average of the new baseline time interval and the average time interval for the multiple search sessions. In some implementations, the client device 102 can associate a default baseline time interval for a user, for example, when the user is a new user for whom the client device 102 does not have a profile.

Alternatively, or in addition, the client device 102 can determine the user's typing speed (for example, by dividing a number of keystrokes received by a time to receive the multiple keystrokes), and store the typing speed. The client device 102 can monitor the user's typing speed, for example, over multiple search sessions. Based on the monitored typing speed, the client device 102 can update the baseline time interval. For example, the client device 102 may have determined that the user's typing speed is 30 words per minute in a first search session and 24 words per minute in a subsequent, second search session. Based on these determinations, the client device 102 can determine an average typing speed for the user as 27 words per minute. The client device 102 can monitor the user's typing speed in subsequent search sessions and update the average typing speed based on the monitored typing speed in each session. Other metrics for typing speed, for example, keystrokes per second, can be used.

In some situations, multiple users can use the client device 102. In such situations, the client device 102 can create a user account for each user and store the user accounts in the computer-readable storage medium 106. For each user, the client device 102 can develop a user profile and determine a respective baseline time interval, as described above.

As an alternative or in addition to determining a time interval, the client device 102 can determine a typing speed by dividing a number of keystrokes received to a time taken to receive the keystrokes. For example, the client device 102 can determine a respective typing speed for successive keystrokes. Alternatively, or in addition, the client device 102 can receive multiple keystrokes and determine a typing speed for all the received keystrokes. In such implementations, the client device 102 can transmit characters corresponding to the received series of keystrokes when the client device 102 determines that a typing speed determined for a particular keystroke and a preceding keystroke is less than a baseline speed. In some situations, the client device 102 can additionally determine a typing acceleration, for example, by dividing a difference between two typing speeds by a time, to determine whether or not to transmit characters corresponding to keystrokes to the server system 108.

The server system 108 is configured to provide resources to the client device 102 in response to receiving an input from the client device 102. A resource can include, for example, a document including text, an audio file, a video file, an image, or combinations of them (for example, a web page). The server system 108 is configured to present the resources in a user interface, such as the user interface 120. For example, the server system 108 is configured to render the resources in an Internet browser displayed in the user interface 120. In some implementations, the server system 108 can receive the resources from one or more server systems (not shown) that are connected to the server system 108 and that store the resources. Alternatively, or in addition, the server system 108 can include a computer-readable storage medium (not shown) that can store the resources.

For example, the server system 108 can include an Internet search engine configured to receive a query term as an input, search for resources that satisfy the query term, and provide the resources as an output. Alternatively, or in addition, the server system 108 can include a query term auto-completion system configured to receive a portion of a query term as the query is being received, and to provide query term auto-completions that are likely to match the query term.

In some implementations, when the server system 108 receives a series of characters that correspond to received keystrokes from the client device 102, the server system 108 treats the received characters as a query term, identifies search results that satisfy the query term, and transmits a search engine results page that includes the search results to the client device 102. Alternatively, or in addition, the server system 108 treats the received characters as a portion of a query term, identifies auto-completions (for example, predictions of words or phrases that a user wants to type without the user actually typing it completely), and transmits the autocompletions to the client device 102. The client device 102 displays the search engine results page or the auto-completions or both in the user interface 120.

As described above, the client device 102 transmits the received characters to the server system 108 upon determining a decrease in a user's typing speed, which represents a logical break in input. When the client device 102 displays search results or auto-completions (or both) in the user interface 120, then the user views the results or the auto-completions when the user pauses or slows typing.

To summarize the example described with reference to FIG. 1, the client device 102 receives five characters at times $t_0$, $t_1$, $t_2$, $t_3$, and $t_4$, respectively. Upon receiving the fifth character, the client device 102 determines that the time interval between receiving a particular keystroke (for example, the keystroke corresponding to the fifth character) and a preceding keystroke (for example, the keystroke corresponding to the fourth character) exceeds a baseline time interval. At time $t_5$, the client device 102 transmits the characters corresponding to the received keystrokes to the server system 108. The server system 108 transmits search engine results page (or query term auto-completions or both) to the client device 102. The client device 102 displays the search results 142, 144 in a user interface, such as user interface 150.

The user can either select one of the search results or the query term auto-completions or can continue typing using the keyboard 116. If the user continues to add characters to those that the user has previously provided, then the client device 102 can perform the above-described operations with respect to the added keystrokes and the added characters represented by those keystrokes.

Figure 2:
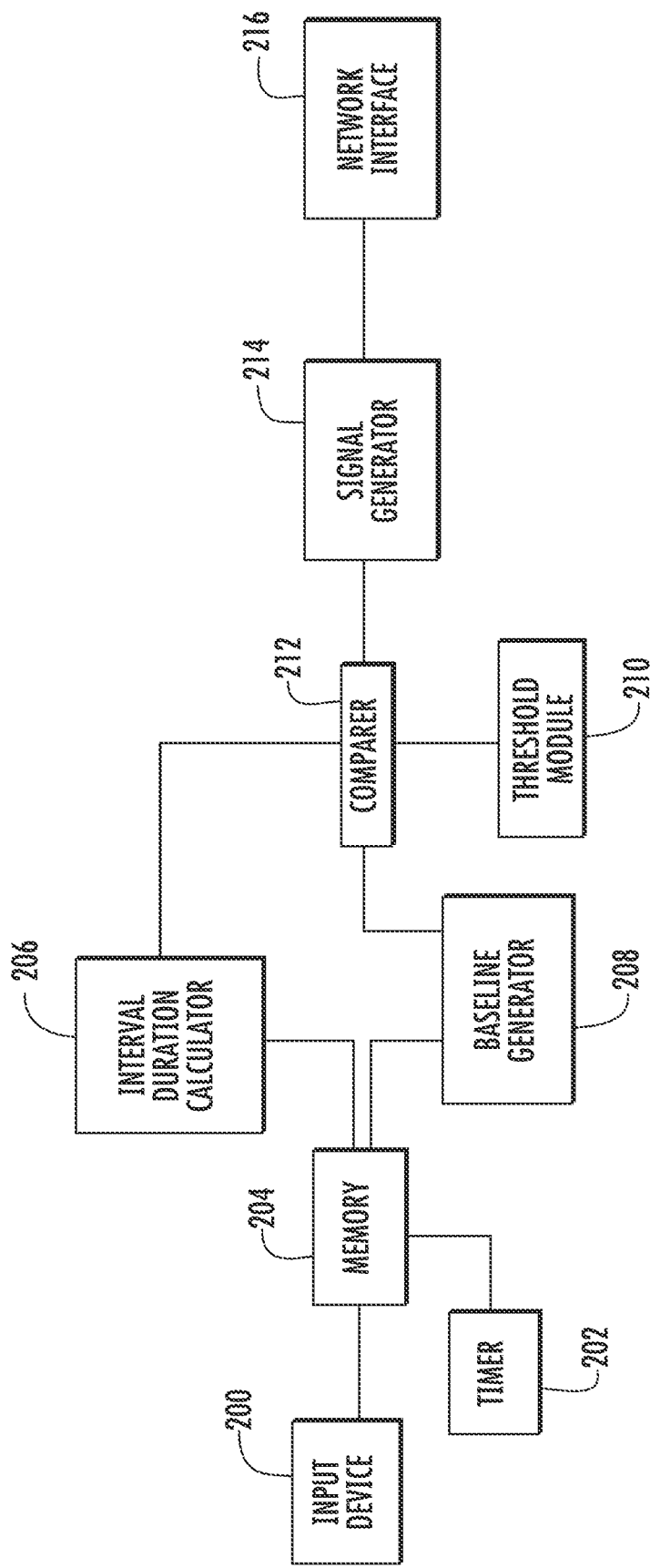
FIG. 2 illustrates an example of a client device architecture.

FIG. 2 illustrates an example of a client device architecture. In particular, FIG. 2 illustrates some of the components included in a client device, such as the client device 102, which operate to perform the operations described above. Each of the components illustrated in FIG. 2 can be configured to perform particular operations or actions by virtue of having software, firmware, hardware, or a combination of them installed on the component that in operation causes the component to perform the actions. One or more computer programs can be configured to perform particular operations or actions by virtue of including instructions that, when executed by data processing apparatus, cause the apparatus to perform the actions.

In some implementations, the client device receives user input through an input device 200, for example, a keyboard, a keypad, a touchscreen, a trackball, and the like. The user input can include a series of keystrokes that correspond to characters. A timer 202 tracks times at which keystrokes are received. A memory 204, which is connected to the input device 200, stores characters that correspond to the received keystrokes and times tracked by the timer 202. An interval duration calculator 206 obtains the times stored in the memory 204 and determines a time interval between keystrokes, for example, a particular keystroke and a preceding keystroke. In some implementations, the memory 204 stores each time interval determined by the interval duration calculator 206.

A baseline generator 208 obtains the time intervals from the memory 204 to determine a baseline time interval. As described above, when the client device determines that a time interval between receiving a particular keystroke and receiving a preceding keystroke exceeds the baseline time interval, the device transmits characters that correspond to one or more of the keystrokes to the server system 108. The baseline generator 208 determines the baseline time interval, for example, as an average of multiple time intervals determined by the interval duration calculator 206. In some implementations, the baseline generator 208 uses three or more keystrokes that precede the particular keystroke to determine the baseline time interval. The generator 208 additionally determines a standard deviation of the average.

The interval duration calculator 206 determines time intervals between keystrokes as the input device 200 receives the keystrokes. A comparer 212 obtains each time interval from the interval duration calculator 206 and compares the time interval with the baseline time interval determined by the baseline generator 208. In particular, the comparer 212 determines if a difference between a time interval between receiving a particular keystroke and a preceding keystroke exceeds a threshold value stored in threshold 210. For example, the threshold value can be the standard deviation from the average of the multiple time intervals multiplied by a coefficient greater than 1.0, for example, 1.3, 1.5, 2.1.

If the comparer 212 determines that the difference exceeds the threshold value stored in the threshold 210, then the comparer 212 causes the signal generator 214 to transmit a signal to the network interface 216. In response to receiving the signal, the network interface 216 transmits the series of keystrokes, for example, the keystrokes received by the input device 200 and stored in the memory 204, to a server system, such as the server system 108.

Figure 3:
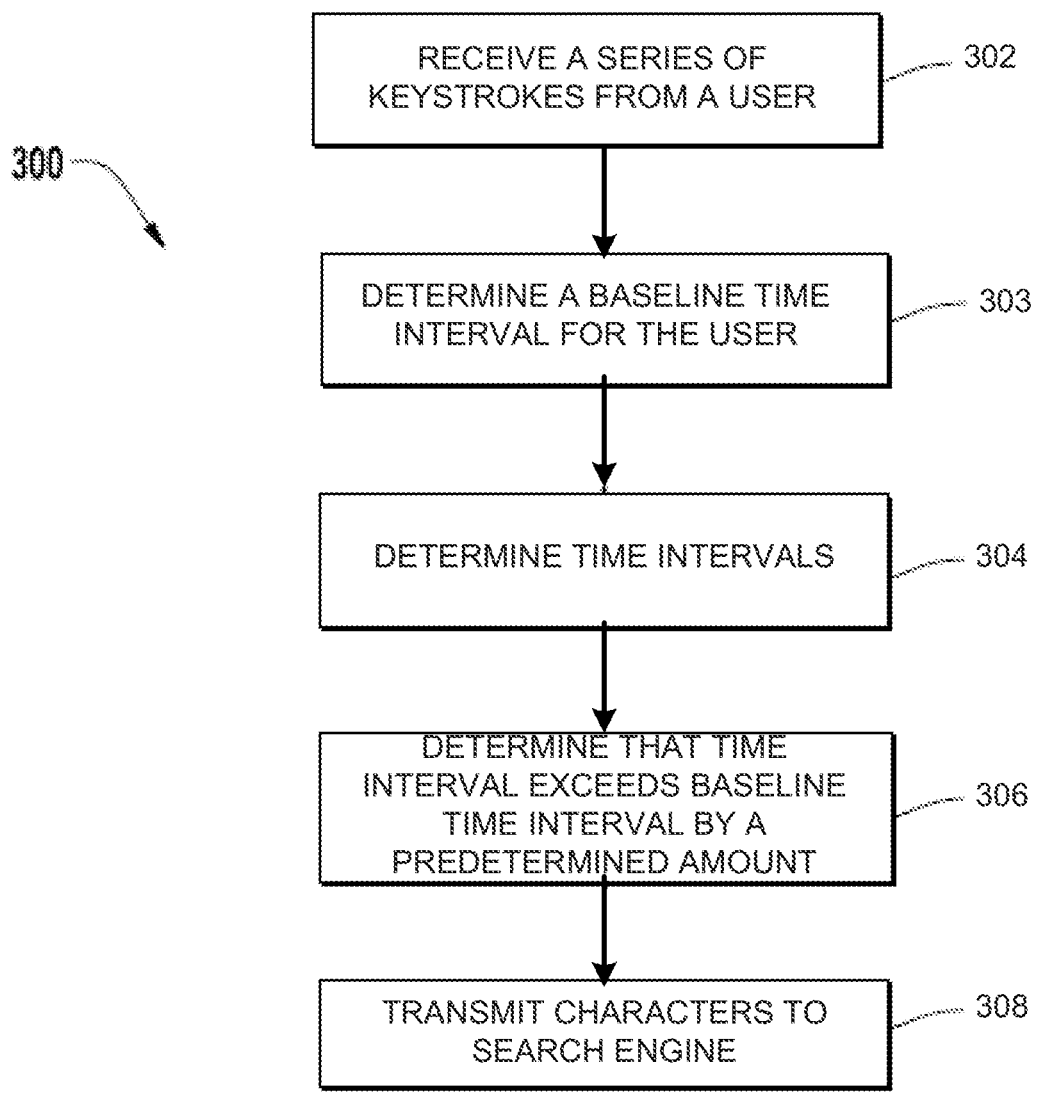
FIG. 3 is a flowchart of an example process.

FIG. 3 is a flowchart of an example process 300. The process 300 can be implemented by a device, such as the client device 102. The process 300 includes receiving a series of keystrokes from a user (step 302). For example, the client device receives a series of keystrokes entered by a user through a keyboard, the keystrokes corresponding to multiple characters. The process 300 includes determining a baseline time interval for the user (step 303). For example, the client device determines the baseline time interval using three or more keystrokes of the series that precede the particular keystroke. In some situations, the baseline time interval is an average of the time intervals of the three or more keystrokes of the series that precede the particular keystroke. Alternatively, or in addition, the device determines the baseline time interval from user profile information.

The process 300 includes determining time intervals (step 304). For example, the client device determines a time interval between receiving a particular keystroke and receiving a preceding keystroke. The client device determines such time intervals for all the keystrokes in the series. In some situations, the particular keystroke is a last keystroke in the series, and the preceding keystroke is a next-to-last in the series. Alternatively, the particular keystroke may not be the last keystroke and the preceding keystroke may not be the next-to-last. The preceding keystroke may or may not be a keystroke that immediately precedes the particular keystroke.

The process 300 includes determining that a time interval exceeds a baseline time interval by a predetermined amount (step 306). The client device additionally determines whether a difference between the average and the time interval between receiving the particular keystroke and receiving the preceding keystroke exceeds a standard deviation from the average by a pre-determined threshold. When the time interval exceeds the baseline time interval by the predetermined amount, then the characters are transmitted to a search engine (step 308).

Figure 4:
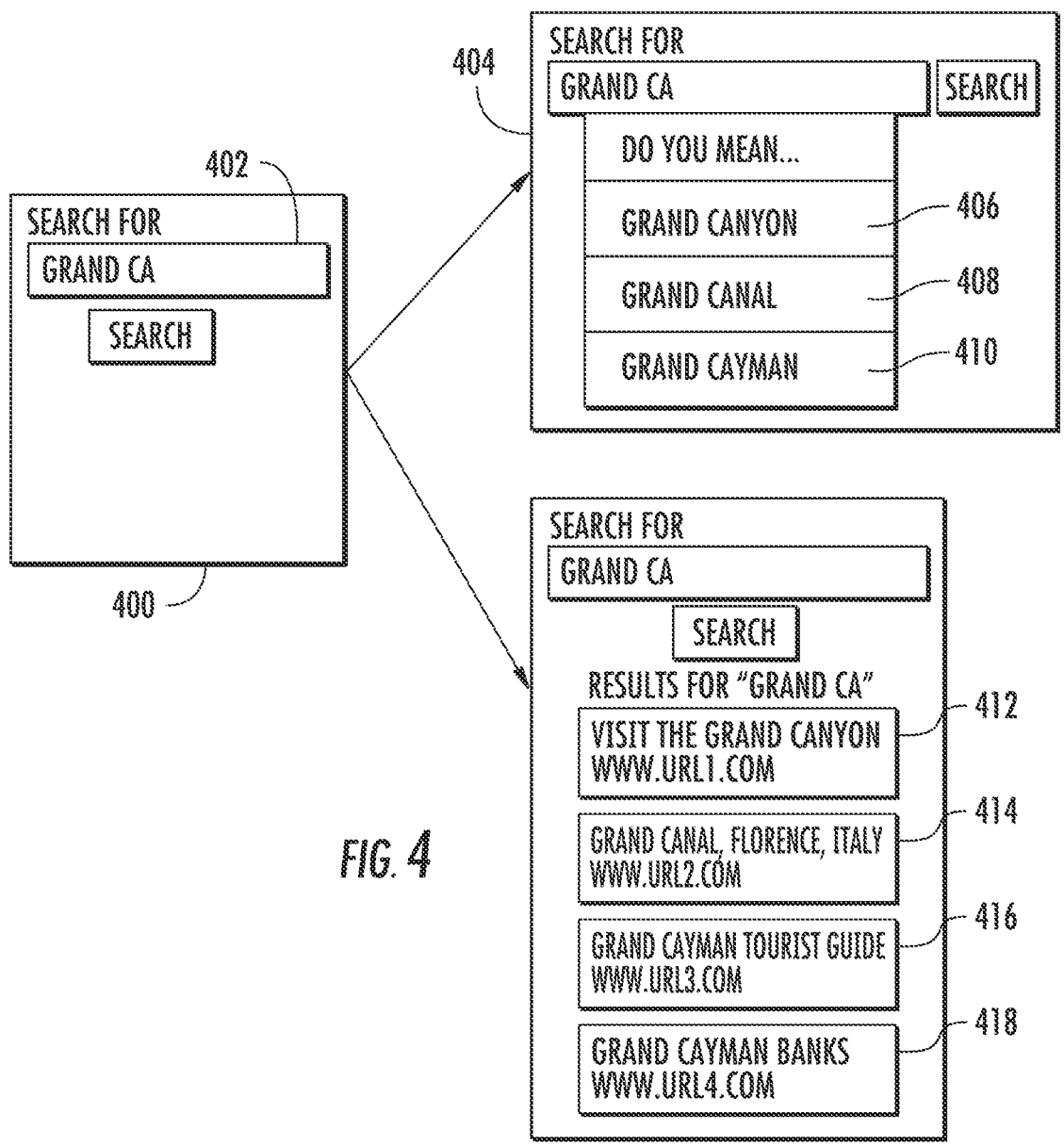
FIG. 4 illustrates examples of user interfaces displayed by the client device.

FIG. 4 illustrates examples of user interfaces displayed by the client device. As described above, the client device displays a user interface, for example, user interface 400 in the display device. Within the user interface 400, the client device displays a control 402, for example, a text box. A user can position a cursor within the control 402, and provide a series keystrokes that correspond to characters. The client device can receive the keystrokes and display the corresponding characters in the control 402.

For example, the user provides keystrokes that correspond to the string "Grand Ca." For each of the characters in the string (i.e., "G", "r", "a", "n", "d", a white space, "C", and "a"), the client device stores a time that a respective keystroke was received, and determines a time interval between a particular keystroke and a preceding keystroke, for example, a last keystroke and a next-to-last keystroke. As described above, based on the time intervals, the client device determines a baseline time interval. Upon receiving the keystroke corresponding to the character "a", the device determines that a time interval between receiving the character "a" and receiving the character "C" exceeds the baseline time interval. This situation may arise because the user is unsure of what character to type next or of the spelling of the word that the user intends to type.

In response to determining that the time interval exceeds the baseline time interval, the client device transmits the characters that have been received until then (i.e., "Grand Ca") to a server system, for example, a search engine or a query term suggesting engine or both. The client device transmits the string of characters received until then as a query term or terms for the search query. The search engine receives the characters from the client device and treats the received characters as a query term. Accordingly, the search engine identifies resources that satisfy "Grand Ca" and provides a search engine results page that references the resources to the client device. The client device renders the search results in the user interface. For example, if the search engine determines that resources describing the Grand Canyon are relevant to the query term "Grand Ca", then the search engine identifies such resources and provides a search engine results page that references such resources to the client device. The client device displays each search result in a corresponding control, for example, as a first search result 412, a second search result 414, a third search result 416, and a fourth search result 418.

Alternatively, or in addition, the query term suggesting engine receives the characters from the client device and treats the received characters as at least a portion of a query term. Accordingly, the query suggesting engine identifies search queries that satisfy "Grand Ca" and provides the auto-completions to the client device. The client device renders the auto-completions in the user interface. For example, the client device renders "Grand Canyon" in control 406, "Grand Canal" in control 408, and "Grand Cayman" in control 410 as auto-completions to "Grand Ca". The user can either select one of the search results or the query term auto-completions. Alternatively, the user can continue to provide keystrokes to add to the characters already displayed in the control 402. The client device can receive the additional keystrokes, and perform the operations described above.

Figure 5:
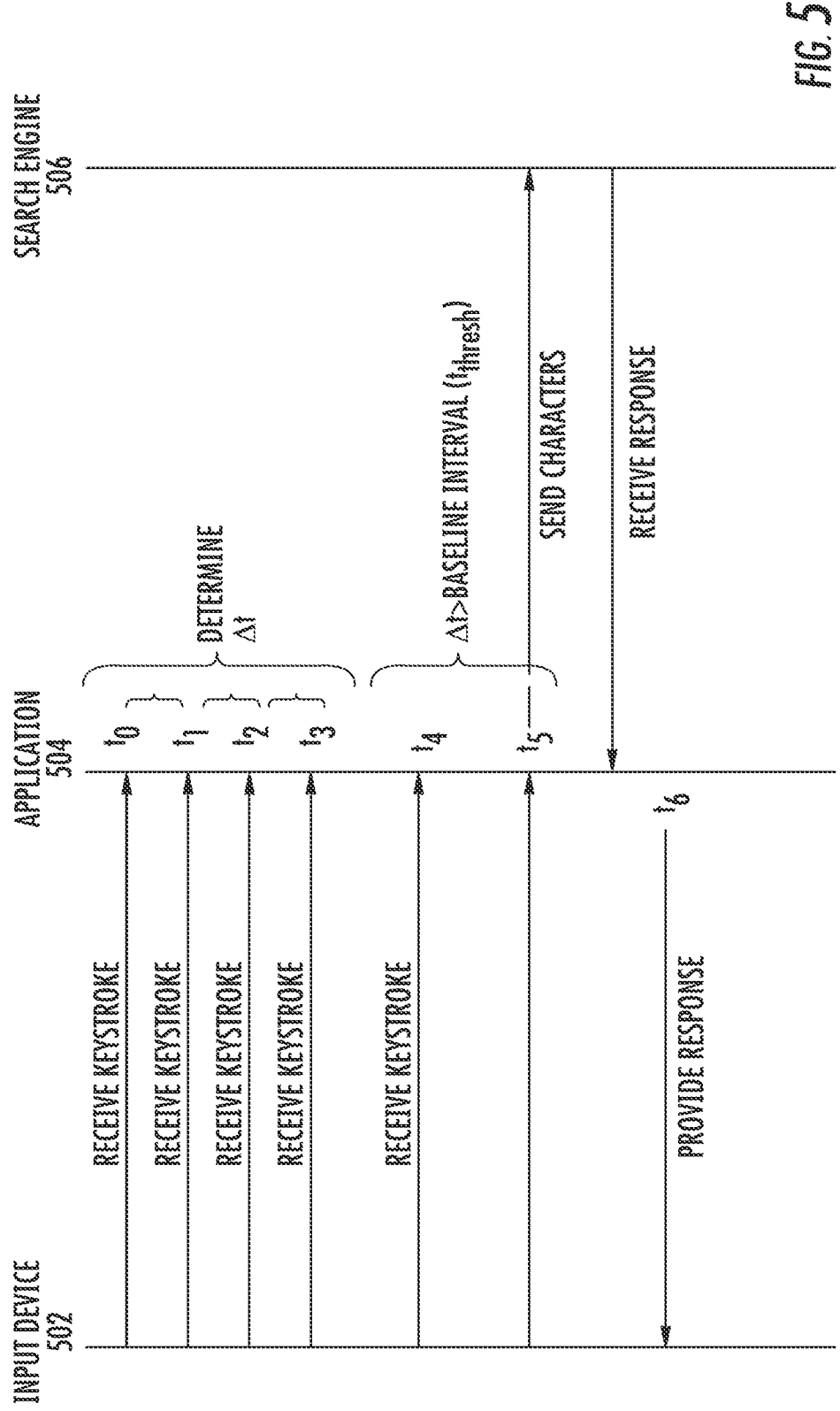
FIG. 5 illustrates example processes implemented by a mobile device and a search engine.

FIG. 5 illustrates example processes implemented by a mobile device and a search engine. In some implementations, the mobile device includes data processing apparatus that execute computer software instructions stored on a computer-readable storage medium included in the mobile device to execute an application 504. The mobile device includes an input device 502 through which the device receives input in the form of a series of keystrokes that correspond to multiple characters.

The application 504 tracks times (for example, $t_0, t_1, t_2, t_3, t_4, t_5$) at which the mobile device receives each keystroke. The application 504 determines multiple time intervals ($\Delta t_1 = t_1 - t_0, \Delta t_2 = t_2 - t_1, \Delta t_3 = t_3 - t_2, \Delta t_4 = t_4 - t_3, \Delta t_5 = t_5 - t_4$) between receiving two keystrokes, in particular, receiving a particular keystroke and receiving a preceding keystroke. In the example processes shown in FIG. 5, from the first three time intervals ($\Delta t_1, \Delta t_2, \Delta t_1$), the application 504 determines a baseline time interval. Upon receiving a keystroke at time $t_4$, the application 504 determines that the time interval $\Delta t_3$ exceeds the baseline time interval by a predetermined amount. In response, at $t_5$, the application 504 transmits characters that correspond to the keystrokes received at $t_0, t_1, t_2, t_3$, and $t_4$ to a search engine 506 as input, for example, as a query term or terms for a query. The search engine 506 identifies resources that satisfy the input and provides the identified resources to the application 504 at $t_6$. The application 506 provides the resources as output to a display device, for example, the display device through which input was received. A user can either select one of the resources or continue to provide input using the input device 502.

By implementing the techniques described above, a client device can provide at least a portion of a query term received from a user to a search engine as the user is providing the query. In response, the client device can present to the user instant search results or instant query term auto-completions or both. As described above, the client device provides characters received through user input to a search engine upon determining that a user's typing speed has slowed to below a threshold determined based on the speed at which the user typed preceding characters in the input. In addition, the client device can provide the input to the search engine in response to other determinations including determining actions by the user.

For example, the client device can receive an indication to transmit the characters provided using the keyboard to the search engine. The indication can be the selection of an "Enter" key on the keyboard. Alternatively, or in addition, when the user selects the spacebar on the keyboard, the client device can determine that the user has provided a complete representation of a word. In response, the client device can transmit all the characters that were received prior to the selection of the spacebar to the search engine as input, i.e., as a query term or terms for a query. In some situations, the client device can set a threshold on the time between keystrokes, and transmit received characters to the search engine when the client device detects the threshold.

Alternatively, or in addition, the client device is configured to implement the techniques described above based on receiving a voice input (such as an utterance or other voice signal). For example, the client device implements a speech recognition application that converts voice input into text. In particular, by speaking into a microphone connected to the client device, the user provides voice input that the client device converts into a corresponding string of characters. The client device determines a speed at which the user speaks into the microphone. When the client device determines that the speed has decreased below a baseline speed that the client device has determined for the user, then the client device determines a logical break in the user's voice input. Upon determining the logical break, the client device transmits the characters that correspond to the voice input received up through the determination of the logical break to a server system, for example, a search engine.

In some implementations, the client device is configured to implement the techniques described above based on receiving images. For example, in an image-based search, the client device can determine a speed at which the user uploads multiple images for searching, and upon determining that the speed at which the user uploads the images has decreased below a baseline speed, then the client device transmits one or more of the images received up through the determination of the decrease in the speed to a server system, for example, a search engine.

The techniques described here can be implemented to search, for example, for text, displayed in a document. For example, the client device can display a document in a user interface. In response to input, the client device can display a control, such as a textbox, in the user interface, into which a user can enter characters that may correspond to characters in the document. The client device can implement the techniques described here to present potentially matching characters as the user is providing the characters to be searched. In such situations, the client device need not transmit at least a portion of characters received in the control over a network. Instead, the client device can perform the search operation on a locally stored document. The document can be, for example, a webpage of a website, an electronic book (e-book), and the like.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a first series of keystrokes that correspond to an initial portion of a partial search query input by a user, and a second series of keystrokes that correspond to a subsequent portion of the partial search query input by the user;
   determining a first time delay that is associated with a rate of input of the keystrokes that correspond to the initial portion of the partial search query, based on one or more time intervals between keystrokes of the first series of keystrokes that correspond to the initial portion of the partial search query input by the user;
   determining a second time delay that is associated with a rate of input of the keystrokes that correspond to the subsequent portion of the partial search query input by the user, based on one or more time intervals between keystrokes of the second series of keystrokes that correspond to the subsequent portion of the partial search query input by the user;
   determining a threshold amount based on a statistical measure associated with two or more time intervals between successive keystrokes of the first series of keystrokes that correspond to the initial portion of the partial search query input by the user;
   determining that the second time delay exceeds the first time delay by the threshold amount that is determined based on the statistical measure, based on a comparison of the first time delay and the second time delay; and
   in response to determining that the second time delay exceeds the first time delay by the threshold amount that is determined based on the statistical measure, transmitting, to a search engine, a search request for the partial search query.

2. The method of claim 1, wherein the first time delay is an average of one or more time intervals between keystrokes of the first series of keystrokes that correspond to the initial portion of the partial search query input by the user,
   wherein the second time delay is an average of one or more time intervals between keystrokes of the second series of keystrokes that correspond to the subsequent portion of the partial search query input by the user, and
   wherein determining that the second time delay exceeds the first time delay by the threshold amount that is determined based on the statistical measure comprises determining that the average of the one or more time intervals between keystrokes of the second series of keystrokes that correspond to the subsequent portion of the partial search query input by the user exceeds the average of the one or more time intervals between keystrokes of the first series of keystrokes that correspond to the initial portion of the partial search query input by the user by the threshold amount that is determined based on the statistical measure.

3. The method of claim 1, wherein determining the threshold amount that is determined based on the statistical measure comprises:
   determining a standard deviation of two or more time intervals between successive keystrokes of the first series of keystrokes that correspond to the initial portion of the partial search query input by the user;
   selecting a coefficient value; and
   establishing, as the threshold amount that is determined based on the statistical measure, the product of the standard deviation and the coefficient value.

4. The method of claim 1, wherein the search request for the partial search query is a request for search results that are relevant to the partial search query.

5. The method of claim 1, wherein the search request for the partial search query is a request for query term autocompletions that correspond to the partial search query.

6. The method of claim 1, wherein the partial search query comprises one or more characters corresponding to one or more keystrokes of the first series of keystrokes that correspond to the initial portion of the partial search query input by the user or to one or more keystrokes of the second series of keystrokes that correspond to the subsequent portion of the partial search query input by the user.

7. A non-transitory computer readable storage device storing computer software instructions executable by one or more data processing apparatus to perform operations comprising:
   receiving a first series of keystrokes that correspond to an initial portion of a partial search query input by a user, and a second series of keystrokes that correspond to a subsequent portion of the partial search query input by the user;
   determining a first time delay that is associated with a rate of input of the keystrokes that correspond to the initial portion of the partial search query, based on one or more time intervals between keystrokes of the first series of keystrokes that correspond to the initial portion of the partial search query input by the user;
   determining a second time delay that is associated with a rate of input of the keystrokes that correspond to the subsequent portion of the partial search query input by the user, based on one or more time intervals between keystrokes of the second series of keystrokes that correspond to the subsequent portion of the partial search query input by the user;

determining a threshold amount based on a statistical measure associated with two or more time intervals between successive keystrokes of the first series of keystrokes that correspond to the initial portion of the partial search query input by the user;

determining that the second time delay exceeds the first time delay by the threshold amount that is determined based on the statistical measure, based on a comparison of the first time delay and the second time delay; and in response to determining that the second time delay exceeds the first time delay by the threshold amount that is determined based on the statistical measure, transmitting, to a search engine, a search request for the partial search query.

8. The computer-readable device of claim 7, wherein the first time delay is an average of one or more time intervals between keystrokes of the first series of keystrokes that correspond to the initial portion of the partial search query input by the user, wherein the second time delay is an average of one or more time intervals between keystrokes of the second series of keystrokes that correspond to the subsequent portion of the partial search query input by the user, and wherein determining that the second time delay exceeds the first time delay by the threshold amount that is determined based on the statistical measure comprises determining that the average of the one or more time intervals between keystrokes of the second series of keystrokes that correspond to the subsequent portion of the partial search query input by the user exceeds the average of the one or more time intervals between keystrokes of the first series of keystrokes that correspond to the initial portion of the partial search query input by the user by the threshold amount that is determined based on the statistical measure.

9. The computer-readable device of claim 7, wherein determining the threshold amount that is determined based on the statistical measure comprises:

determining a standard deviation of two or more time intervals between successive keystrokes of the first series of keystrokes that correspond to the initial portion of the partial search query input by the user;

selecting a coefficient value; and establishing, as the threshold amount that is determined based on the statistical measure, the product of the standard deviation and the coefficient value.

10. The computer-readable device of claim 7, wherein the search request for the partial search query is a request for search results that are relevant to the partial search query.

11. The computer-readable device of claim 7, wherein the search request for the partial search query is a request for query term auto-completions that correspond to the partial search query.

12. The computer-readable device of claim 7, wherein the partial search query comprises one or more characters corresponding to one or more keystrokes of the first series of keystrokes that correspond to the initial portion of the partial search query input by the user or to one or more keystrokes of the second series of keystrokes that correspond to the subsequent portion of the partial search query input by the user.

13. A system comprising:

one or more computers; and a computer readable storage medium storing computer software instructions executable by the one or more computers to perform operations comprising:

receiving a first series of keystrokes that correspond to an initial portion of a partial search query input by a user, and a second series of keystrokes that correspond to a subsequent portion of the partial search query input by the user;

determining a first time delay that is associated with a rate of input of the keystrokes that correspond to the initial portion of the partial search query, based on one or more time intervals between keystrokes of the first series of keystrokes that correspond to the initial portion of the partial search query input by the user;

determining a second time delay that is associated with a rate of input of the keystrokes that correspond to the subsequent portion of the partial search query input by the user, based on one or more time intervals between keystrokes of the second series of keystrokes that correspond to the subsequent portion of the partial search query input by the user;

determining a threshold amount based on a statistical measure associated with two or more time intervals between successive keystrokes of the first series of keystrokes that correspond to the initial portion of the partial search query input by the user;

determining that the second time delay exceeds the first time delay by the threshold amount that is determined based on the statistical measure, based on a comparison of the first time delay and the second time delay; and in response to determining that the second time delay exceeds the first time delay by the threshold amount that is determined based on the statistical measure, transmitting, to a search engine, a search request for the partial search query.

14. The system of claim 13, wherein the first time delay is an average of one or more time intervals between keystrokes of the first series of keystrokes that correspond to the initial portion of the partial search query input by the user, wherein the second time delay is an average of one or more time intervals between keystrokes of the second series of keystrokes that correspond to the subsequent portion of the partial search query input by the user, and wherein determining that the second time delay exceeds the first time delay by the threshold amount that is determined based on the statistical measure comprises determining that the average of the one or more time intervals between keystrokes of the second series of keystrokes that correspond to the subsequent portion of the partial search query input by the user exceeds the average of the one or more time intervals between keystrokes of the first series of keystrokes that correspond to the initial portion of the partial search query input by the user by the threshold amount that is determined based on the statistical measure.

15. The system of claim 13, wherein determining the threshold amount that is determined based on the statistical measure comprises:

determining a standard deviation of two or more time intervals between successive keystrokes of the first series of keystrokes that correspond to the initial portion of the partial search query input by the user;

selecting a coefficient value; and establishing, as the threshold amount that is determined based on the statistical measure, the product of the standard deviation and the coefficient value.

16. The system of claim 13, wherein the search request for the partial search query is a request for search results that are relevant to the partial search query.

17. The system of claim 13, wherein the search request for the partial search query is a request for query term auto-completions that correspond to the partial search query.

18. The system of claim 13, wherein the partial search query comprises one or more characters corresponding to one or more keystrokes of the first series of keystrokes that correspond to the initial portion of the partial search query input by the user or to one or more keystrokes of the second series of keystrokes that correspond to the subsequent portion of the partial search query input by the user.

19. A computer-implemented method comprising:
  receiving a first series of keystrokes that correspond to an initial portion of a partial search query input by a user, and a second series of keystrokes that correspond to a subsequent portion of the partial search query input by the user;
  determining a first time delay that is associated with a rate of input of the keystrokes that correspond to the initial portion of the partial search query, based on one or more time intervals between keystrokes of the first series of keystrokes that correspond to the initial portion of the partial search query input by the user;
  determining a second time delay that is associated with a rate of input of the keystrokes that correspond to the subsequent portion of the partial search query input by the user, based on one or more time intervals between keystrokes of the second series of keystrokes that correspond to the subsequent portion of the partial search query input by the user;
  determining a threshold amount based on a statistical measure associated with two or more time intervals between successive keystrokes of the first series of keystrokes that correspond to the initial portion of the partial search query input by the user;
  determining that the second time delay exceeds the first time delay by the threshold amount that is determined based on the statistical measure, based on a comparison of the first time delay and the second time delay; and
  in response to determining that the second time delay exceeds the first time delay by the threshold amount that is determined based on the statistical measure, bypassing transmission, to a search engine, of a search request for the partial search query.

\* \* \* \* \*